United States Patent
Mäke et al.

(10) Patent No.: US 10,265,892 B2
(45) Date of Patent: Apr. 23, 2019

(54) MOLD SYSTEM AND PROCESS FOR PRODUCING COMPONENTS BY THE RTM PROCESS

(71) Applicant: THYSSENKRUPP CARBON COMPONENTS GMBH, Kesselsdorf (DE)

(72) Inventors: Sandro Mäke, Dohma (DE); Jens Werner, Coswig (DE); André Bartsch, Grosshennersdorf (DE); Michael Dressler, Dresden (DE); Christian Köhler, Dresden (DE)

(73) Assignee: THYSSENKRUPP CARBON COMPONENTS GMBH, Kesselsdorf (DE)

( * ) Notice: Subject to any disclaimer, the term of this patent is extended or adjusted under 35 U.S.C. 154(b) by 391 days.

(21) Appl. No.: 14/913,531

(22) PCT Filed: Aug. 22, 2014

(86) PCT No.: PCT/EP2014/067874
§ 371 (c)(1),
(2) Date: Feb. 22, 2016

(87) PCT Pub. No.: WO2015/025027
PCT Pub. Date: Feb. 26, 2015

(65) Prior Publication Data
US 2016/0200018 A1  Jul. 14, 2016

(30) Foreign Application Priority Data
Aug. 23, 2013 (DE) .................. 10 2013 216 863

(51) Int. Cl.
*B29C 45/00* (2006.01)
*B29C 70/48* (2006.01)
(Continued)

(52) U.S. Cl.
CPC .......... *B29C 45/0005* (2013.01); *B29C 70/48* (2013.01); *B29C 70/548* (2013.01); *B29C 33/44* (2013.01); *B29L 2031/00* (2013.01)

(58) Field of Classification Search
None
See application file for complete search history.

(56) References Cited

U.S. PATENT DOCUMENTS 5,824,249 A  10/1998 Leitch et al.

FOREIGN PATENT DOCUMENTS

| CA | 2 842 142 A1 | 1/2013 |
| CH | 479 392 A | 10/1969 |

(Continued)

*Primary Examiner* — Monica A Huson
(74) *Attorney, Agent, or Firm* — McGlew and Tuttle, P.C.

(57) ABSTRACT

A mold system for a resin transfer molding process is presented, in which a cavity of a workpiece (1) to be produced is fully enclosed circumferentially by a multi-part shaping mold (2). The shaping mold (2) is enclosed in a sealed manner by an outer, two or more part enveloping mold (7, 8). A method for consolidating a fiber composite component with this mold system and a method for producing a fiber composite component on the basis of the RTM process is provided, in which the intermediate space between a shaping mold (2) and a surrounding enveloping mold (7, 8) is filled with resin during the resin injection. After curing the resin initially remains on the shaping mold (2) as a resin body but is destroyed during the demolding of the workpiece (1), at predetermined breaking points. The demolding of the workpiece (1) from the shaping mold (2) is assisted.

16 Claims, 10 Drawing Sheets

(51) Int. Cl.
*B29C 70/54* (2006.01)
*B29L 31/00* (2006.01)
*B29C 33/44* (2006.01)

(56) References Cited

FOREIGN PATENT DOCUMENTS

| | | |
|---|---|---|
| DE | 36 26 019 C1 | 11/1987 |
| DE | 10 2005 008 479 A1 | 8/2006 |
| DE | 10 2009 010692 A1 | 12/2009 |
| DE | 10 2005 008 479 B4 | 7/2011 |
| DE | 10 2011 083688 A1 | 4/2013 |

MOLD SYSTEM AND PROCESS FOR PRODUCING COMPONENTS BY THE RTM PROCESS

CROSS REFERENCE TO RELATED APPLICATIONS

This application is a United States National Phase Application of International Application PCT/EP2014/067874 filed Aug. 22, 2014 and claims the benefit of priority under 35 U.S.C. § 119 of German Patent Application 10 2013 216 863.2 filed Aug. 23, 2013 the entire contents of which are incorporated herein by reference.

FIELD OF THE INVENTION

The present invention pertains to a mold system and a process for producing components by the RTM process.

BACKGROUND OF THE INVENTION

Fiber composite plastic parts with complex shapes can be produced by means of the Resin Transfer Molding (RTM) process. There are two approaches here. In a first variant, the duroplastic matrix material is quickly applied to the surface of the fiber preform that is located in an open mold form, and subsequently the mold form is closed and the fiber preform is compressed and consolidated at the same time because of the high mold internal pressure resulting from the closing forces of the hydraulic press. In a second variant, the duroplastic matrix material is inserted with very high injection pressure into a closed mold form, in which a fiber preform is located. The high injection pressure leads to a time reduction of the consolidation phase, while ensuring the full impregnation of the fiber reinforcement structure.

Laminating presses are frequently used for both approaches mentioned above. The presses comprise a lower press part and an upper press part, which in the closed state form a pressure-tight process chamber for the component. The lower press part and/or the upper press part can be moved axially in relation to the other respective press part to open and close the laminating press. Furthermore, elements for evacuating and/or for applying pressure may be integrated.

The subject of DE 10 2005 008 479 B4 is a mold system, in which a mold part has a trough-like frame structure, into which the raw material for producing the component is inserted. A cover is inserted into this trough, so that the raw material for producing the component is inserted between the trough and the cover and both parts are sealed against each other with a seal. In this connection, the cover is inserted into the trough via an immersion edge. As a drawback, undercut contours cannot be produced with the mold presented in this patent, since the removal from the mold must always take place axially to the sealing surface.

SUMMARY OF THE INVENTION

An object of the present invention is to overcome the drawbacks of the state of the art and provide a mold system and a process, which makes it possible to produce complex fiber composite plastic parts, especially with an undercut contour, in a simple and cost-effective manner. Last but not least, the process and device shall be suitable for mass production.

The mold system according to the present invention has a shaping mold and an enveloping mold. The multipart shaping mold encloses the cavity of the component to be produced in the closed state. In this case, the number of parts of the shaping mold depends on the complexity of the component to be produced, especially on the number of undercuts.

The outer contour of the shaping mold in the closed state is shaped such that the shaping mold can be inserted into the cavity of the enveloping mold. The cavity of the enveloping mold corresponds largely to the outer shape of the shaping mold. In any case, the cavity of the enveloping mold must be larger than the outer shape of the shaping mold in the closed state, since this would otherwise no longer be able to be inserted into the enveloping mold. Even if the cavity of the enveloping mold is considerably larger than the outer shape of the shaping mold, this is unfavorable, since all intermediate spaces are filled with the duroplastic matrix material to be inserted and thus mean a loss of material.

The shaping mold may also be completely closed first by the enveloping mold. For this purpose, the closed shaping mold with partially still open cavity is inserted into the correspondingly designed enveloping mold, so that the cavity for the workpiece is subsequently defined by the shaping mold and the enveloping mold. It is advantageous here when the direction of removal from the mold for the bringing together of the shaping mold and the enveloping mold corresponds to the direction of removal from the mold of the enveloping mold.

As an alternative, a part of the shaping mold may also lie in the enveloping mold. while the other parts of the shaping mold, which is closed and enclosing the workpiece cavity, are inserted into the enveloping mold. Thus, the shaping mold is first closed with the insertion into the enveloping mold.

The concrete shape of the molds depends on the shape of the workpiece to be produced, so that a generally preferred shape cannot be indicated within the scope of this invention specification.

For example, for rotationally symmetrical workpieces, it has proven to be advantageous to image the circumference through four elements of the shaping mold. Advantageously, the fiber preform is thus not pinched or displaced during the closing of the mold.

The enveloping mold has a multipart, but especially preferably two-part, design, since the number of gaps to be sealed is thus lowest. In the closed state, these parts form a tightly sealed process chamber. Advantageously, the shaping mold, which has a number of parts which increases with the complexity of the cavity to be reproduced, does not have to be sealed. Of course, the spacing of the shaping mold in the closed state should be minimal to guarantee a high quality of the component to be produced. The pressure-tight process chamber for building up the pressure for the consolidation is formed by the enveloping mold in the device according to the present invention, however. Thus, all gaps of the shaping mold are filled with the matrix material during the consolidation. Because of the preferably minimal spacing, these gaps advantageously break up during the removal of the component from the shaping mold.

In this connection, spacers are arranged partially or completely spaced apart on the surface of the individual parts of the shaping mold. The cleaning of the shaping mold after use is considerably simplified by means of these spacers. A thickness of the matrix material which can be easily removed or easily cleaned is adjusted by means of the spacers. Thus, the cleaning of the shaping mold from a very thin layer of matrix material is very complicated compared to a somewhat thicker layer, which can be removed in a simple manner. Furthermore, friction is advantageously reduced by means of the spacers on the oblique surfaces for generating the closing force of the shaping mold, as a result of which a lower closing force is necessary.

Especially advantageously, the cavity of the enveloping mold and the outer shape of the shaping mold are coordinated with one another, such that the enveloping mold holds the shaping mold closed in its cavity in the closed state.

The enveloping mold in the closed state especially preferably applies a closing force to the shaping mold. For this, oblique surfaces, by means of which the closing force of the enveloping mold is converted into a closing force for the shaping mold, are arranged on the outside on the shaping mold and correspondingly on the inside in the enveloping mold.

The closing forces for the enveloping mold may be introduced via an upper and/or a lower press bedplate.

Adjacent parts of the shaping mold are especially advantageously connected in a positive-locking manner, such that only one motion in the closing direction of the shaping mold is possible. Thus, the closing force of the enveloping mold can advantageously also be used for closing the shaping mold in an especially efficient manner, since the force introduced by the oblique surfaces can only lead to a motion in the closing direction of the shaping mold.

Furthermore, the shaping mold in the closed state preferably has the smallest possible spacing of preferably less than 1 mm, especially preferably between 0.05 mm and 0.2 mm, only in direct proximity to the cavity. All other gaps are designed as wider, preferably greater than 0.2 mm, and especially preferably between 0.2 mm and 3 mm Such a high quality of the workpiece to be produced with minimal effort at the same time for the cleaning of the molds is advantageously achieved.

In principle, the optimal spacing for a simple cleaning with simultaneously desired minimal loss of material varies depending on the matrix material used. The spacers are preferably designed as ribs or dots. Preferably, the spacers have a height of 0.5 mm to 3 mm, and especially preferably 1 mm.

Furthermore, the spacers have a linear or punctiform area of contact, i.e., the smallest possible area of contact with the adjacent part of the shaping mold or the enveloping mold. Especially advantageously, the contact surface is arched, preferably with a radius of 1 mm to 100 mm Such a Hertzian stress is advantageously achieved at the point of contact of the spacers with the adjacent component in the closed state of the molds, as a result of which the excess matrix material can be removed free from residues in a simple manner. The cross-sectional shape of the spacers is thus preferably circular with convexly arched tips or sinusoidal or parabolic.

Furthermore, one seal each is preferably arranged in a contact surface of the two enveloping mold parts and between the upper enveloping mold and the upper part of the shaping mold, such that the two enveloping parts in the closed state produce a pressure-tight process chamber.

Furthermore, the mold system is preferably equipped with a mixing head for feeding the matrix material, the feed line of which is led laterally out of one of the enveloping mold parts.

In an especially preferred embodiment, the outer surfaces of the shaping mold have stop faces for connecting with support elements, which are preferably magnetically fastened. As a drawback, elements for a positive-locking connection would be enclosed after using the matrix material and would have to be cleaned in a time-consuming manner. In this connection, the use of a magnetic fastening is advantageous. As an alternative, the fastening may also take place by means of suction cups.

Furthermore, a subject of the present invention is a process for consolidating a fiber composite component by means of the mold system described.

In a first process step a), the fiber preform is inserted into the cavity of the open shaping mold and this shaping mold is closed. As an alternative, an element of the shaping mold may already be inserted during the production of the fiber preform. Following this process step, the fiber preform is inserted in the cavity of the shaping mold and enclosed by this mold. It is not necessary for the shaping mold to fully enclose the cavity for the workpiece, this may also take place first by or during the subsequent transport into the enveloping mold, as explained above in the mold system. Thus, the shaping mold may also be fully closed by an area of the enveloping mold or even by a part of the shaping mold located in the enveloping mold.

In a preferred embodiment of the process, a non-stick agent is especially inserted into the cavity of the shaping mold before use. This facilitates the removal of the consolidated component from the mold. In order to facilitate the cleaning of the mold from the matrix material, it may also appear meaningful to apply non-stick agent to the other surfaces of the shaping mold and/or in the cavity of the enveloping mold. Teflon, e.g., is suitable as a non-stick agent.

Then, in a second process step b), the shaping mold is inserted into the lower half of the enveloping mold, preferably by means of a lifting device. For this, stopping means are preferably provided on the shaping mold; the connection between stopping means and lifting device especially preferably takes place by means of magnetic forces or suction cups.

The cavity of the workpiece is now fully closed in the shaping mold.

Subsequently, the upper half of the enveloping mold is placed on and the enveloping mold is closed. The closing force is preferably applied to the enveloping mold by means of a press.

Now, in a third process step c), the matrix material is inserted into the pressure-tight cavity of the enveloping mold and/or directly into the cavity of the shaping mold. The component consolidates in the cavity of the shaping mold due to the applied pressure and the selected temperature. The pressure and temperature parameters actually to be used during the consolidation depend on the materials used and are known due to same. The matrix material is preferably injected via one or more injection ports, which are preferably arranged in a punctiform, linear or channel-like manner in the shaping mold.

After the consolidation, the enveloping mold is opened in a process step d). Then, the shaping mold is preferably again lifted by means of a lifting device out of the lower half of the enveloping mold.

In a last process step e), the shaping mold can now be opened and the finished component can be removed.

The matrix material cured in the intermediate space between the enveloping mold and the shaping mold remains as a matrix material body until removal from the shaping mold. During the opening of the shaping mold for the removal of the component from the mold, the matrix material body is preferably partially destroyed in the area of the predetermined breaking points formed by means of the spacers and can thus be easily removed. Thus, the removal of the component from the mold is supported and the effort for cleaning the molds is reduced.

After the cleaning of the molds, a new fiber preform can be inserted into the shaping mold and the process can be repeated.

In a preferred embodiment of the process, the cavity is evacuated, i.e., the air located therein is suctioned out, before carrying out step c). Thus, the consolidation process may advantageously be accelerated and the air outlet valves at the enveloping mold may be omitted.

The present invention is explained below on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
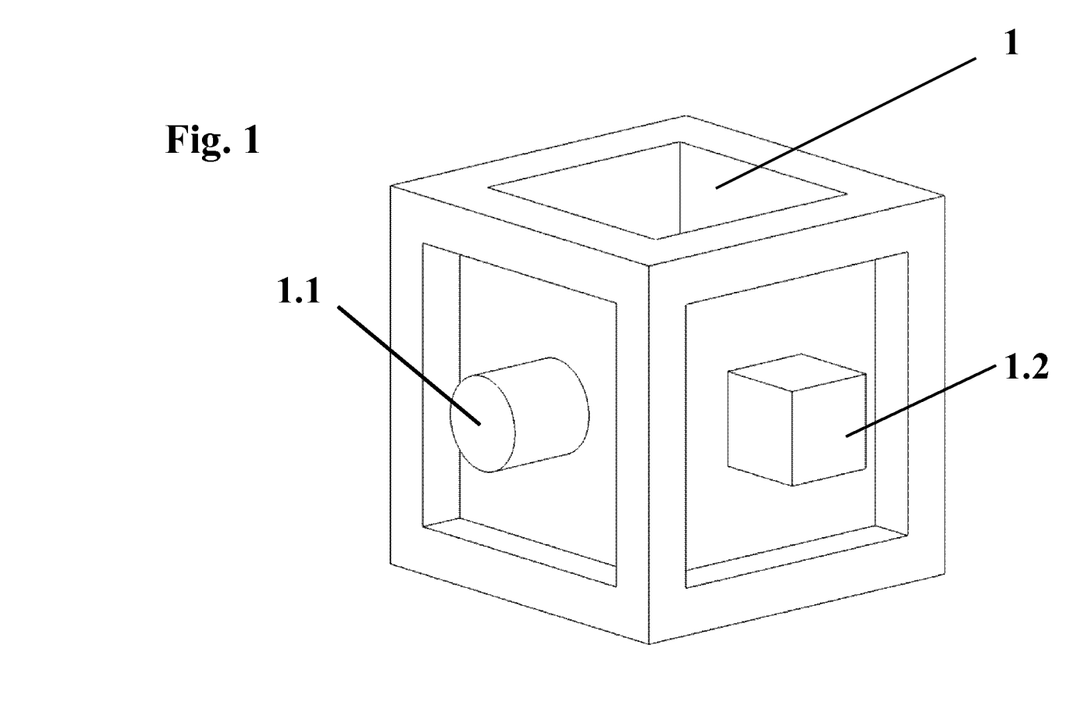
FIG. 1 is a schematic view showing a workpiece to be produced.

FIG. 1 shows a cubic workpiece 1 having undercuts. The workpiece 1 has undercuts 1.1 and 1.2, which make a multi-divided shaping mold necessary.

Figure 2:
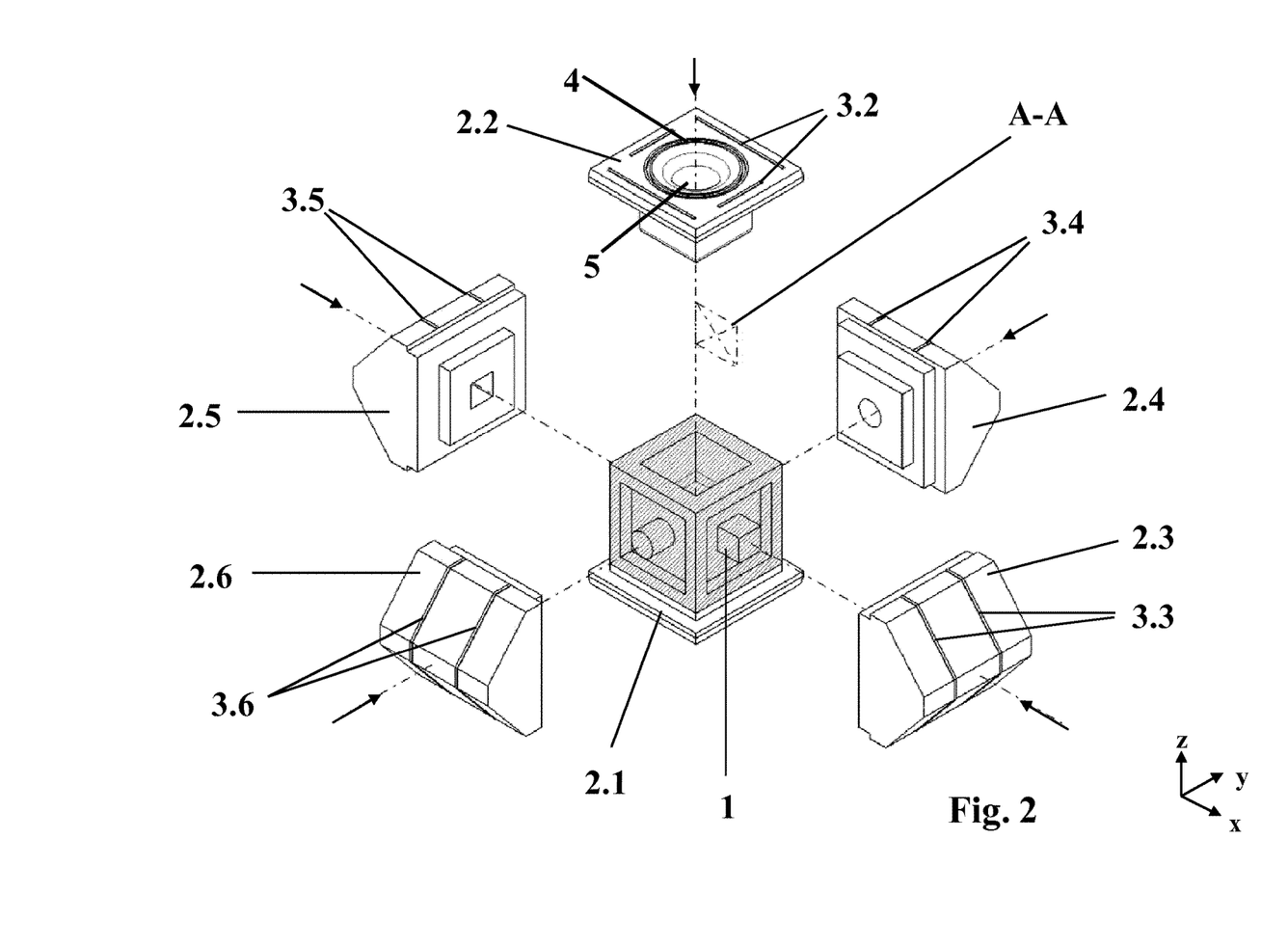
FIG. 2 is a schematic exploded view of a multipart shaping mold.

FIG. 2 shows the workpiece 1 with opened shaping mold 2 in an exploded view. The shaping mold 2 is divided into a bottom element 2.1, a cover element 2.2 and side elements 2.3 through 2.6. Each of the elements 2.1 through 2.6 has spacers 3.1 through 3.6 with a height of 2 mm, which make possible a simple separation of the matrix material adhering after consolidation. An injection port 5, to which matrix material is fed from outside via a feed line, is provided in the cover element 2.2. A sealing groove 4, which prevents matrix material from reaching the channel for the feed line, is arranged about the injection port 5. The sectional plane for the view of FIG. 3 is indicated by the reference number A-A.

Figure 3:
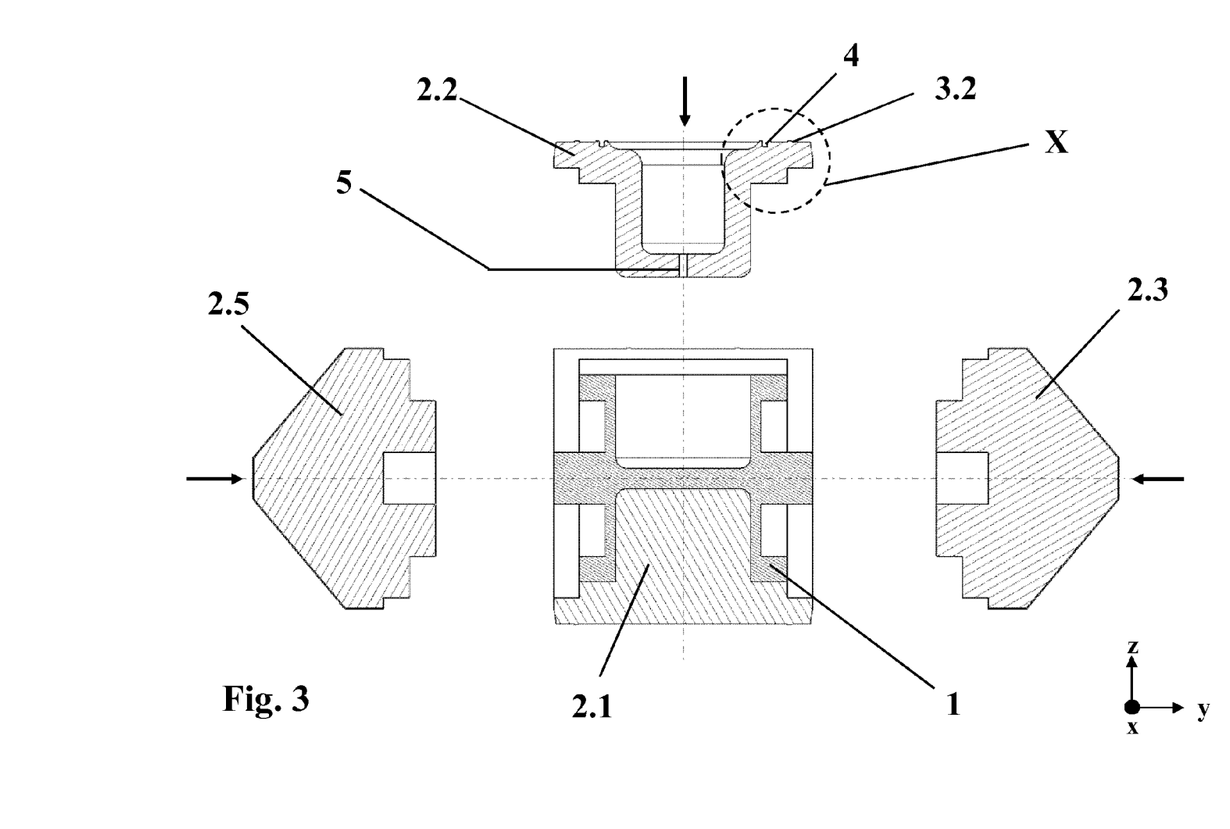
FIG. 3 is a schematic sectional view of the multipart shaping mold removed from the mold with inserted workpiece.
Figure 4:
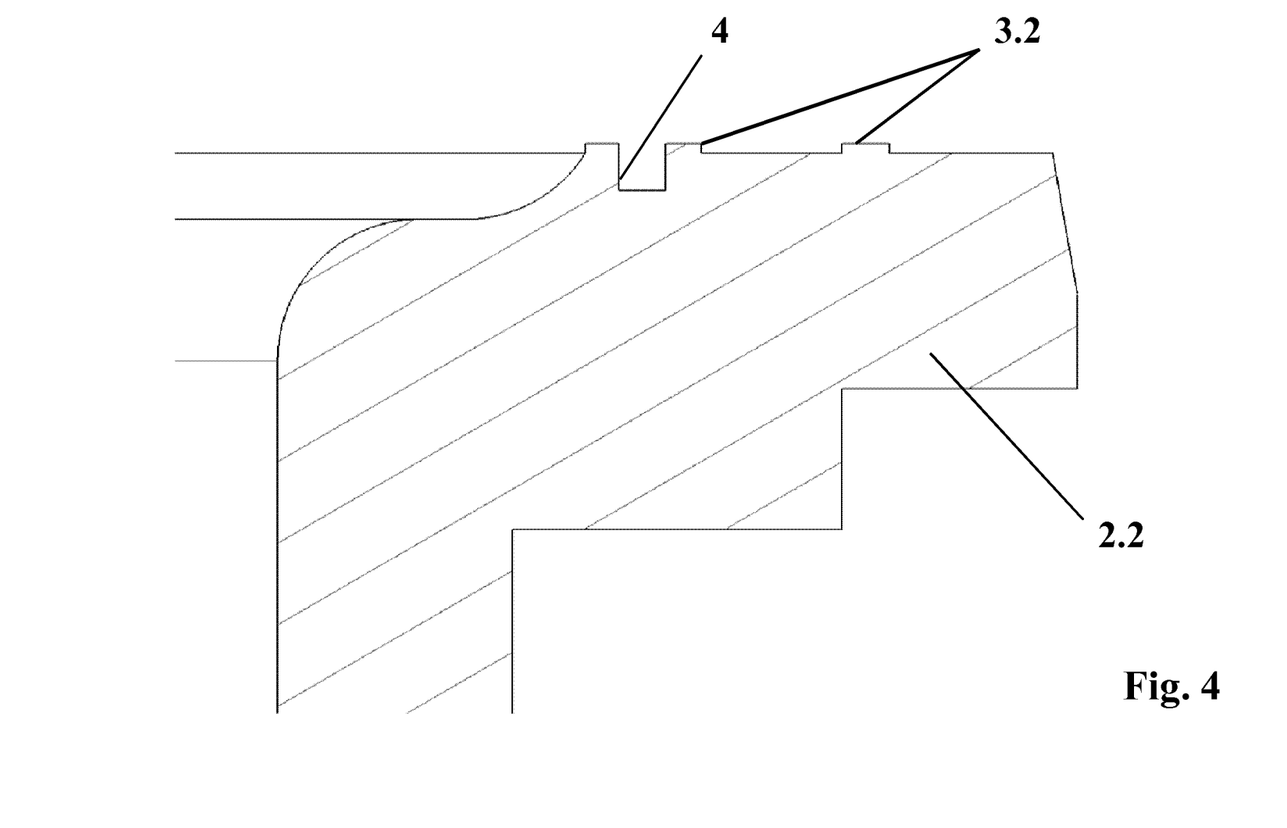
FIG. 4 is a schematic detail view of the shaping mold.

FIG. 3 is a sectional view of FIG. 2. The injection port 5 and the sealing groove 4 are in the cover element 2.2. The sloped surfaces of the side elements 2.3 through 2.6, which are directed outwards, can be easily seen in FIGS. 2 and 3. The contents of the circle designated by X and shown in dotted line are shown in a detailed view as FIG. 4.

Figure 5:
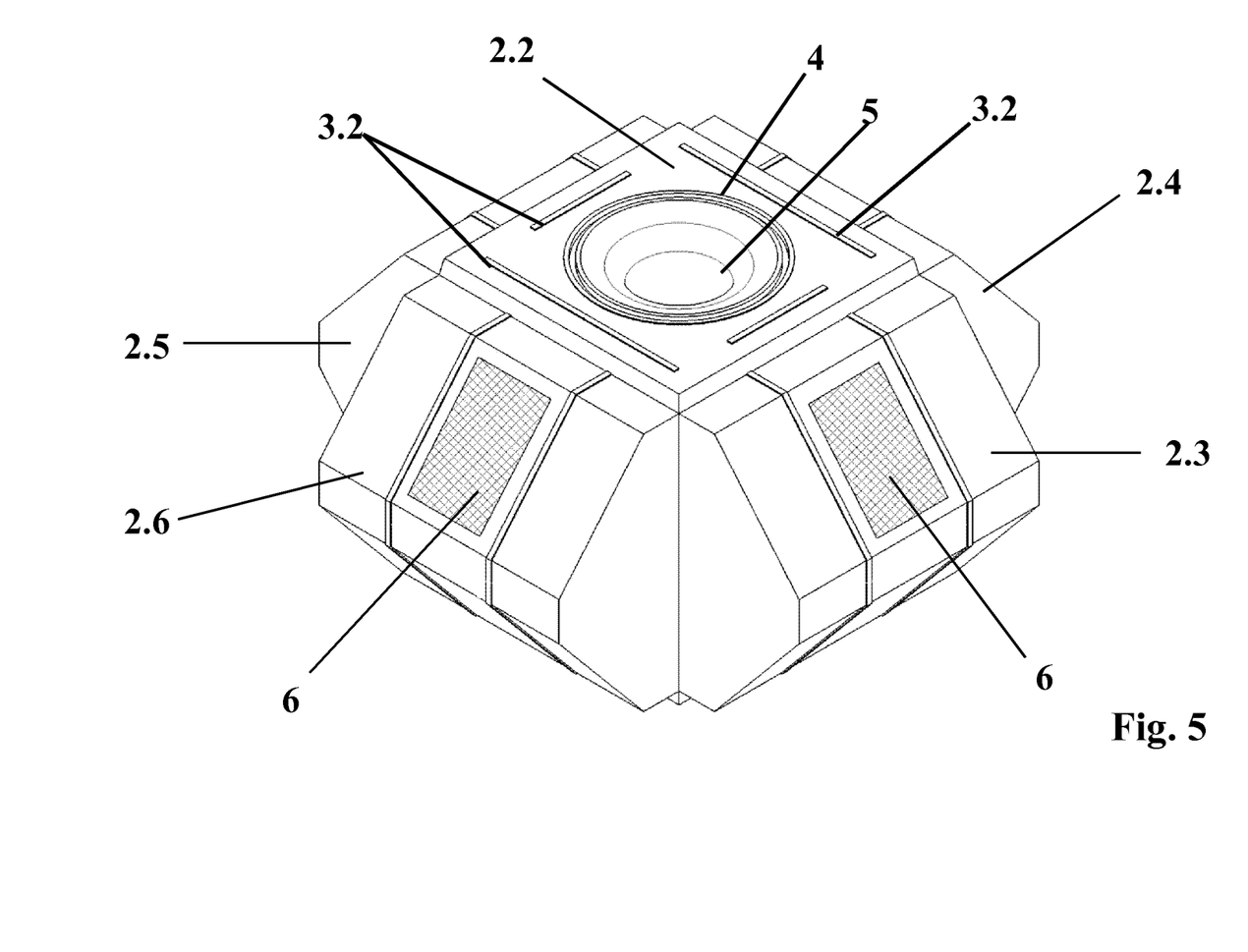
FIG. 5 is a schematic isometric view of the closed shaping mold.

FIG. 5 shows the closed shaping mold 2. Stop faces 6 for connecting to lifting means are provided at each side element 2.3 through 2.6. A support frame, not shown here, which has four magnets for connecting to the stop faces 6, is used for lifting.

Figure 6:
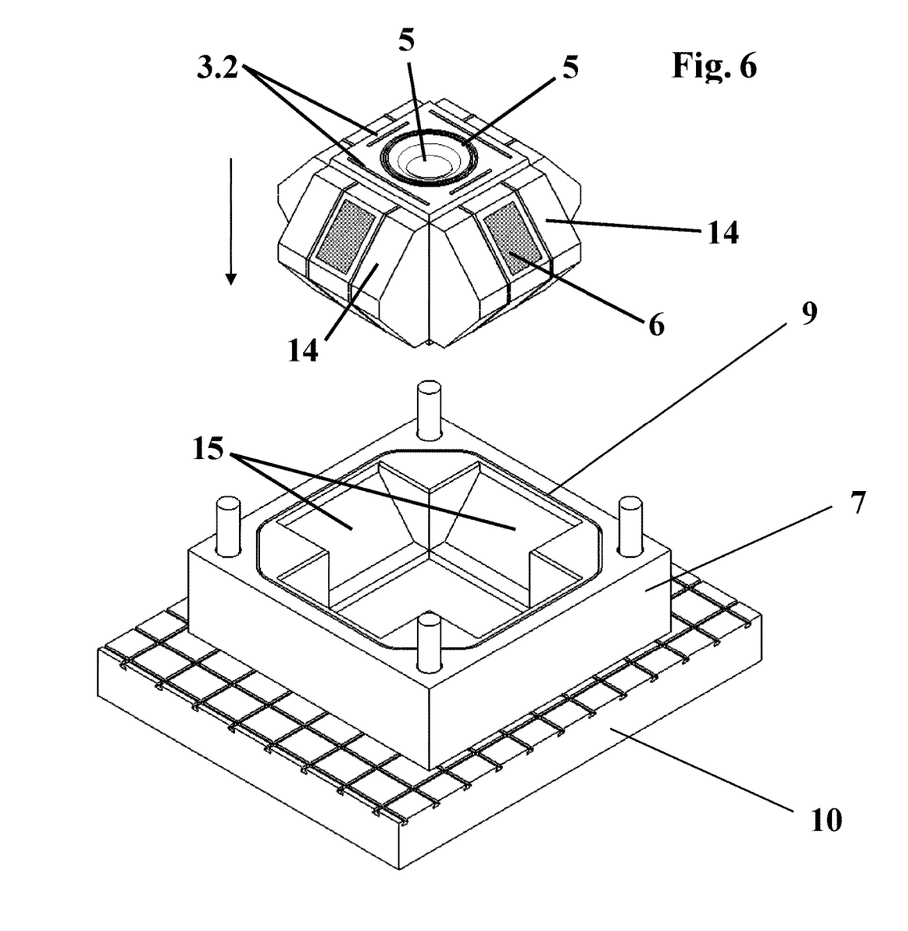
FIG. 6 is a schematic view showing the insertion of the multipart shaping mold into the lower enveloping mold.

FIG. 6 shows the closed shaping mold 2 during the insertion into a lower enveloping mold 7, which is arranged on a bottom press bedplate 10. The sloped surfaces of the side elements 2.3 through 2.6 of the shaping mold 2 and the sloped surfaces 15 in the interior of the lower enveloping mold 7 corresponding hereto can be easily seen. Analogously sloped surfaces 15 are also arranged in the upper enveloping mold 8, which is not shown in detail here. The sloped surfaces 14 and 15 correspond to one another in such a way that the closing force of the enveloping mold 7, 8 acts as a closing force for the shaping mold 2, i.e., it presses the side parts 2.3 through 2.6 in the direction of the cover element 2.2 and the bottom element 2.1.

Figure 7:
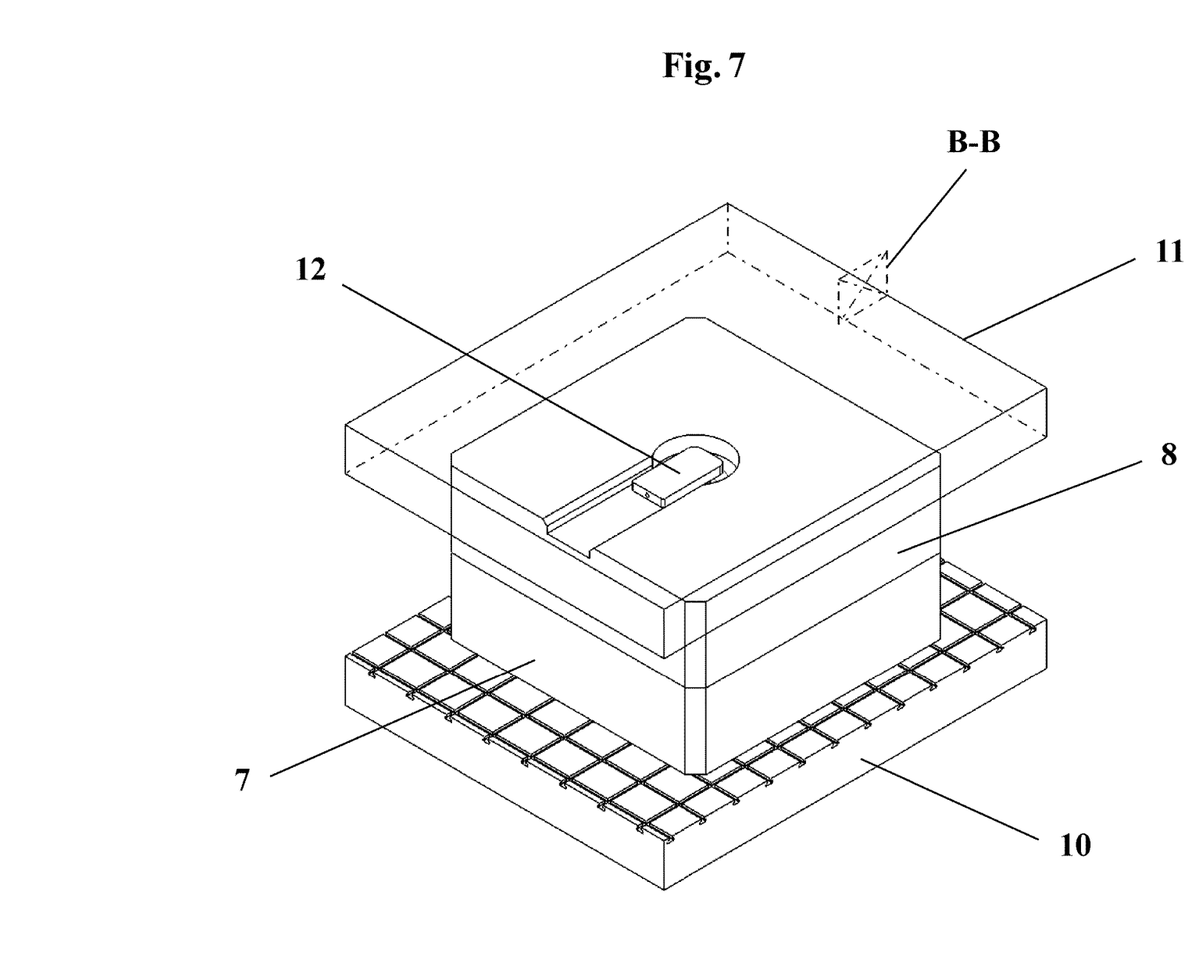
FIG. 7 is a schematic view showing the closed enveloping mold.

FIG. 7 shows the lower enveloping mold 7 after inserting the shaping mold 2 and after placing on the upper enveloping mold 8. Subsequently, the closing force is applied to the enveloping mold 7, 8 by means of a top press bedplate 11. In a channel within the upper enveloping mold 8, the matrix material is fed to a mixing head 12, which lies in front of the injection port, which is not shown in FIG. 7. The sectional plane for the view of FIG. 8 is illustrated by B-B.

Figure 8:
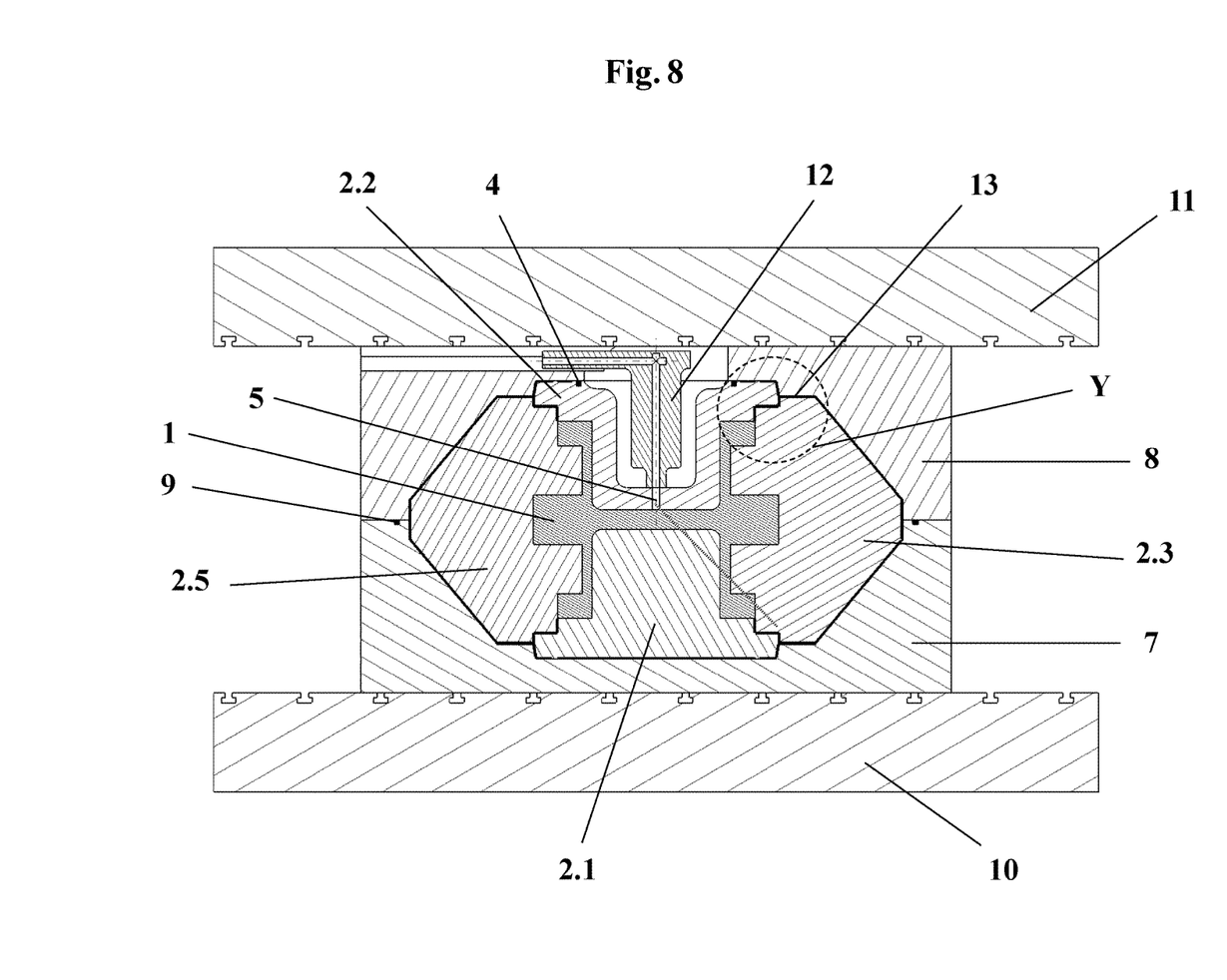
FIG. 8 is a schematic sectional view through the middle plane of the closed mold system with lower and upper press bedplates.

FIG. 8 shows the closed enveloping mold 7, 8 with the shaping mold 2 located therein. The mixing head 12, which is located downstream from the injection port 5, is arranged in the cover element 2.2. The matrix material here is a resin, which is present as a two-component resin, wherein the two components of the resin are fed in the cover element 2.2 separately via a feed line to the mixing head 12, mixed there and subsequently pressed via the injection port 5 into the cavity of the shaping mold 2. An area, which is shown in detail in FIG. 9, is designated by Y.

Figure 9:
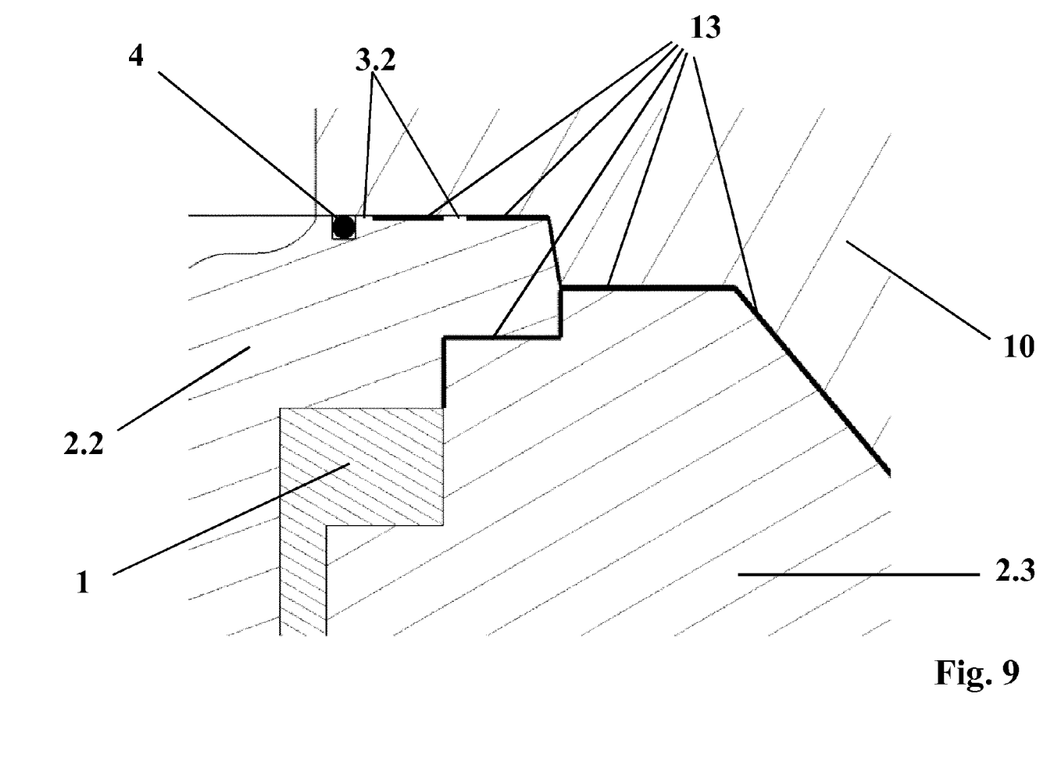
FIG. 9 is a schematic detail view of an area in which two elements of the shaping mold come into contact with the enveloping mold.
Figure 10:
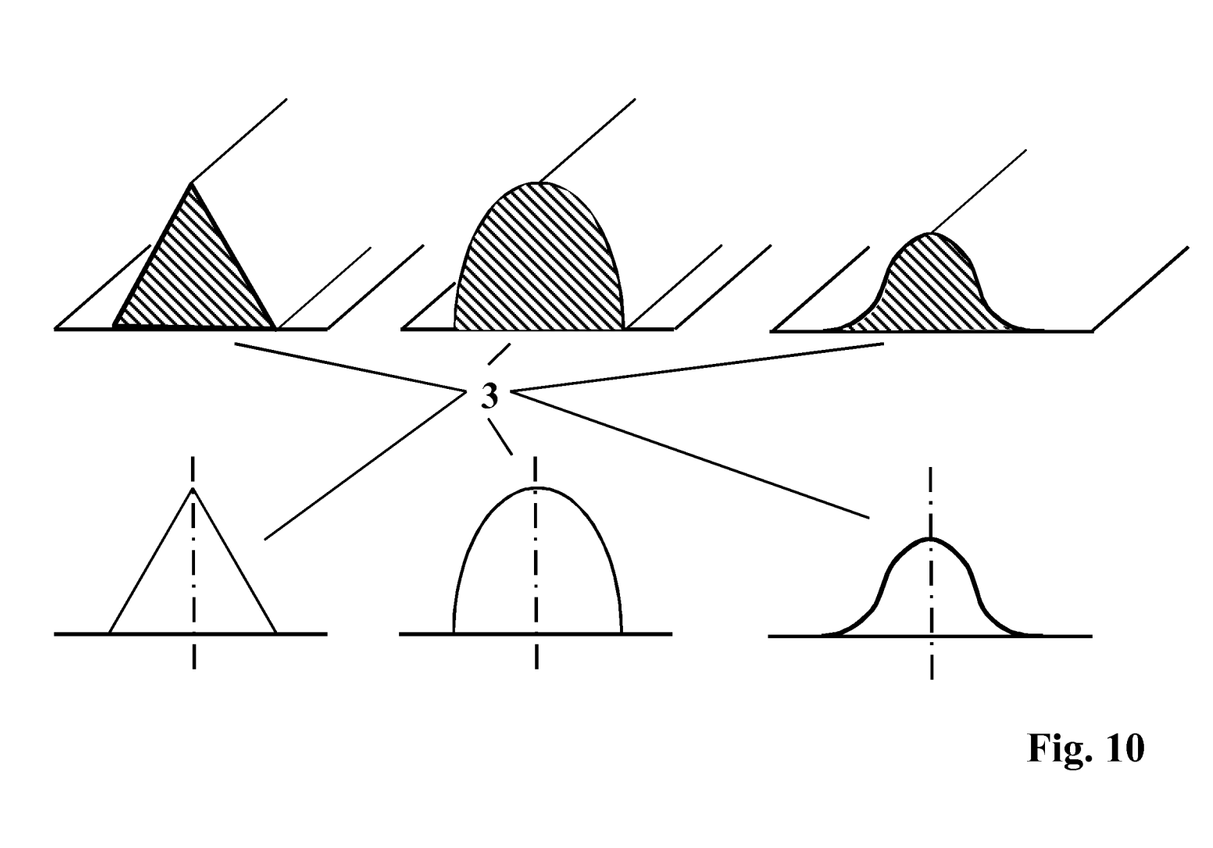
FIG. 10 is a schematic view showing various preferred cross sections of the spacers.

The cover element 2.2, the side element 2.3 and the upper enveloping mold 8 come into contact with each other in this area shown in FIG. 9. The matrix material fills all intermediate spaces between the parts of the shaping mold 2 and exits via these intermediate spaces in the area between the shaping mold 2 and the enveloping mold 7, 8 as well. A defined thickness of the intermediate spaces and thus of the matrix material to be subsequently removed is achieved by the spacers 3.2. The height of 2 mm proved to be particularly advantageous since the matrix material in this thickness can be easily removed without an excessive material loss. The spacers shown here have a largely rectangular cross-sectional shape. Because of the resulting Hertzian stress and the residue-free removal associated therewith, cross-sectional shapes with a punctiform or linear contact surface, as shown in FIG. 10, are preferred, however. Thus, three different preferred cross-sectional shapes of the spacers 3 are shown in FIG. 10: A triangular function on the left side, a parabolic function in the center and an inscribed angle function on the right side. The parabolic function and the inscribed angle function advantageously bring about a Hertzian stress, which makes possible a simple removal of the excess matrix material and, in addition, advantageously guarantee a low wear of the spacers in case of frequent use.

For carrying out the process, first a carbon fiber preform with the outer dimensions 250×250×250 mm (L×W×H) is inserted into the bottom element 2.1 of the forming mold 2. Then, the four side elements 2.3 through 2.6 are moved axially towards the bottom element 2.1 via a linear guiding system arranged on a base plate until they are in contact with the side surfaces of the bottom element 2.1 (FIGS. 2, 3). The cover element 2.2 is then inserted into the thus formed box-like substructure and the forming mold 2, which has the outer dimensions 500×500×300 mm (L×W×H) and an overall weight of 500 kg, is completed (FIG. 5).

As an alternative, the bottom element 2.1 could also be arranged in the lower enveloping mold 7, such that the shaping mold 2 completely encloses the cavity for the workpiece to be manufactured only after the insertion into the lower enveloping mold 7. Furthermore, as an alternative, the bottom element 2.1 could also be formed by the lower enveloping mold 7 itself.

The shaping mold 2 is received by a transport frame, which has carrier magnets, on the upper, sloped surfaces of the side elements 2.3 through 2.6 and inserted into the lower enveloping mold 7, which is arranged on a lower press bedplate 10 (FIG. 6). This arrangement is pushed under a press frame, the upper enveloping mold 8, which is arranged in the press frame, is then lowered onto the lower enveloping mold 7, the press is closed and a locking force of at least 20,000 kN is applied (FIG. 7).

A mixing head 12, via which the matrix material 13, epoxy resin in this case, is injected into the cavity of the shaping mold, is arranged in a recess of the cover element 2.2 of the shaping mold 2. The material and energy feed lines to the mixing head 12 are led out laterally via a recess in the upper enveloping mold 8 (FIG. 8).

The matrix material 13 is pressed under a pressure of 10 bar via the injection port 5 into the shaping mold 2, which is heated indirectly to 100° C., by means of the lower and upper enveloping molds 7, 8 and completely impregnates the carbon fiber preform. The matrix material 13 exits from the gaps of the shaping mold 2 and fills the cavity, which is defined by the spacers 3, between the shaping mold 2 and the enveloping mold 7, 8 (FIG. 9). In this case, a 2-mm-thick epoxy resin film encloses the entire circumference of the shaping mold 2 up to the sealing point between the sealing groove 4 in the shaping mold 2 and the upper enveloping mold 8. The cured matrix material 13 remains at the shaping mold 2 until removal from the mold.

In the reverse sequence of the assembly, the mold system is removed from the press. After the lifting out from the lower enveloping mold 7, the enveloping epoxy resin body, preferably in the area of the predetermined breaking points formed by the spacers 3, is partially destroyed and removed without problems upon opening the shaping mold 2, for removal of the workpiece 1 from the mold.

While specific embodiments of the invention have been shown and described in detail to illustrate the application of the principles of the invention, it will be understood that the invention may be embodied otherwise without departing from such principles.

The invention claimed is:

1. A mold system for a resin transfer molding process (RTM process) the mold system comprising:
 a multipart shaping mold; and
 an at least two-part enveloping mold, wherein the cavity of a workpiece to be produced is fully enclosed by the shaping mold and the shaping mold can be inserted into the at least two-part enveloping mold and the enveloping mold forms a pressure-tight process chamber in a closed state and the shaping mold has spacers on an outside and/or the enveloping mold has spacers on an inside, wherein said spacers define a thickness of intermediate spaces in an area between the shaping mold and the enveloping mold.

2. A mold system in accordance with claim 1, wherein the shaping mold is a slide mold.

3. A mold system in accordance with claim 1, wherein the shaping mold has corresponding oblique surfaces on the outside and the enveloping mold has corresponding oblique surfaces on the inside, by means of which the closing force of the enveloping mold acts as a closing force for the shaping mold.

4. A mold system in accordance with claim 1 wherein the spacers have a height of 0.05 mm to 3 mm.

5. A mold system in accordance with claim 1 wherein the enveloping mold and the shaping mold have a seal and the lower and the upper enveloping molds thus form a pressure-tight process chamber.

6. A mold system in accordance with claim 1 further comprising an injection port and wherein a feed line to the injection port exits laterally from one of the enveloping mold parts.

7. A mold system in accordance with claim 1 wherein the shaping mold has stop faces for a load-absorbing.

8. A mold system for a resin transfer molding process, the mold system comprising:
 a multipart shaping inner mold comprising spacers; and
 an at least two-part outer mold comprising an outer mold interior space, wherein a cavity of a workpiece to be produced is fully enclosed by the multipart shaping inner mold, the multipart shaping inner mold being inserted into the outer mold interior space during the resin transfer molding process, the at least two-part outer mold forming a pressure-tight process chamber in a closed state, wherein the spacers and the at least two part outer mold define a plurality of intermediate spaces between the multipart shaping inner mold and the at least two-part outer mold.

9. A mold system in accordance with claim 8, wherein the spacers define a thickness of the intermediate spaces in an area between the multipart shaping inner mold and the at least two-part outer mold.

10. A mold system in accordance with claim 9, wherein the multipart shaping inner mold is a slide mold.

11. A mold system in accordance with claim 9, wherein the multipart shaping inner mold has corresponding oblique surfaces on the outside and the at least two-part outer mold has corresponding oblique surfaces on the inside, by means of which the closing force of the enveloping mold acts as a closing force for the shaping mold.

12. A mold system in accordance with claim 9, wherein the spacers have a height of 0.05 mm to 3 mm.

13. A mold system in accordance with claim 9, wherein the at least two-part outer mold and the multipart shaping inner mold have a seal and a lower mold and an upper mold of the at least two-part outer mold form the pressure-tight process chamber.

14. A mold system in accordance with claim 9, further comprising an injection port, wherein a feed line to the injection port exits laterally from one part of the at least two-part outer mold.

15. A mold system in accordance with claim 9, wherein the multipart shaping inner mold has stop faces for a load-absorbing.

16. A mold system in accordance with claim 9, wherein the spacers define an outer surface of the multipart shaping inner mold.

\* \* \* \* \*